United States Patent [19]

Yoneda et al.

[11] Patent Number: 5,004,657
[45] Date of Patent: Apr. 2, 1991

[54] BATTERY

[75] Inventors: Tetsuya Yoneda, Tenri; Shin Sato, Kashihara, both of Japan

[73] Assignee: Sharp Kabushiki Kaisha, Osaka, Japan

[21] Appl. No.: 449,450

[22] Filed: Dec. 12, 1989

Related U.S. Application Data

[63] Continuation of Ser. No. 242,613, Sep. 9, 1988, abandoned.

[30] Foreign Application Priority Data

Sep. 9, 1987 [JP] Japan ................. 62-225977

[51] Int. Cl.⁵ ................. H01M 4/52; H01M 10/36
[52] U.S. Cl. ................. 429/193; 429/217; 429/223
[58] Field of Search ............... 429/33, 13, 191, 193, 429/223

[56] References Cited

U.S. PATENT DOCUMENTS

| | | | |
|---|---|---|---|
| Re. 24,408 | 12/1957 | Hack et al. | 429/191 |
| 3,558,360 | 1/1971 | Sverdrup et al. | 429/33 |
| 3,660,163 | 5/1972 | Moser | 429/191 |
| 3,754,995 | 8/1973 | Kleinschmager | 429/33 |
| 3,970,473 | 7/1976 | Roth et al. | 429/191 |
| 3,988,164 | 10/1976 | Liang et al. | 429/191 |
| 4,380,575 | 4/1983 | Nakamura et al. | 429/13 |
| 4,605,603 | 8/1986 | Kanda et al. | 429/59 |
| 4,782,584 | 11/1988 | Mohri et al. | 29/623.1 |

FOREIGN PATENT DOCUMENTS 1546611 9/1976 United Kingdom .
1546613 9/1976 United Kingdom .

*Primary Examiner*—Donald L. Walton
*Attorney, Agent, or Firm*—Birch, Stewart, Kolasch & Birch

[57] ABSTRACT

A battery of this invention comprises a positive-electrode composition, a separator or solid electrolyte composition, and a negative-electrode composition, wherein the positive-electrode composition, the separator or solid electrolyte composition, and the negative-electrode composition are formed into a three-layered tablet structure by the application of pressure, and wherein an electron-conductive means is provided in the inside or on the surface of at least one of the positive-electrode composition and the negative-electrode composition.

4 Claims, 2 Drawing Sheets

BATTERY

This application is a continuation of application Ser. No. 07/242,613 filed on Sept. 9, 1988, now abandoned.

BACKGROUND OF THE INVENTION

1. Field of the invention

This invention relates to a battery, and more particularly to a battery in which the battery contents are integrally formed into a three-layered tablet structure.

2. Description of the prior art

Conventional batteries, particularly batteries using an electrolytic solution, are manufactured in the following way.

For example, in coin-shaped batteries, a positive-electrode composition containing a positive-active material is used to fill or impregnate an electrode substrate. After a positive electrode is obtained by the cutting of this electrode substrate into a disk, this positive electrode substrate and the battery case are welded together. Next, a separator (electrolyte-supporting material) made of a fibrous polymer or of a polymer film is cut into a disk, and this separator is placed on top of the positive-electrode substrate that was already welded as above in the battery case. Next, a negative-electrode composition containing a negative-active material is used to fill or impregnate an electrode substrate in the same way as the positive-electrode composition. After a negative electrode is obtained by the cutting of this electrode substrate into a disk, this negative electrode substrate and the battery cover are welded together. Finally, the battery case is supplied with electrolytic solution, and then sealed, ending the manufacturing process.

In this way, conventional batteries are disadvantageous in that their manufacturing process is complicated as described above, so that much time is required to produce the batteries.

SUMMARY OF THE INVENTION

The battery of this invention, which overcomes the above-discussed and numerous other disadvantages and deficiencies of the prior art, comprises a positive-electrode composition, a separator or solid electrolyte composition, and a negative-electrode composition, wherein said positive-electrode composition, said separator or solid electrolyte composition, and said negative-electrode composition are formed into a three-layered tablet structure by the application of pressure, and wherein an electron-conductive means is provided in the inside or on the surface of at least one of said positive-electrode composition and said negative-electrode composition.

In a preferred embodiment, the positive-electrode composition, said separator or solid electrolyte composition, and said negative-electrode composition are all in the form of powders.

In a preferred embodiment, the negative active material is a hydrogen storage alloy selected from the group consisting of $TiNi$, $TiNiB_{0.01}$, $TiNiMm_{0.01}$, $LaNi_5$, and $TiFe$.

In a preferred embodiment, the electron-conductive means is selected from the group consisting of metals, metal alloys, metal-coated materials, electroconductive polymers, and electroconductive ceramics.

Thus, the invention described herein makes possible the objectives of (1) providing a battery in which the battery contents are formed beforehand into a tablet structure, so that the battery contents can be produced independently on a large scale, simplifying the manufacturing process compared to that needed for conventional batteries; and of (2) providing a battery in which an electron-conductive means is provided in the inside or on the surface of at least one of the positive-electrode composition and the negative-electrode composition to improve the current-collecting effects, so that the internal resistance of the battery is relatively small, and the charging and discharging characteristics are superior to those of conventional batteries.

BRIEF DESCRIPTION OF THE DRAWINGS

This invention may be better understood and its numerous objects and advantages will become apparent to those skilled in the art by reference to the accompanying drawings as follows.

DESCRIPTION OF THE PREFERRED EMBODIMENTS

Figure 1:
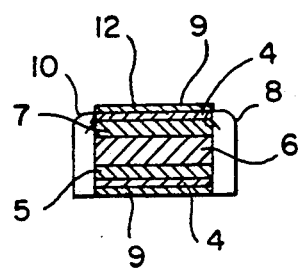
FIG. 1 is a cross-sectional view showing a battery of this invention.

The battery of this invention has as its contents a three-layered tablet structure that is formed by the application of pressure to a layered construction of a positive-electrode composition, a separator or solid electrolyte composition, and a negative-electrode composition, the construction being layered in that order. The positive-electrode composition, the separator or the solid electrolyte composition, and the negative-electrode composition are all in the form of powders; an electron-conductive means is provided either in the inside or on the surface of at least one of these two compositions, the positive-electrode composition or the negative-electrode composition.

First, when a layered tablet is formed by the use of a positive-electrode composition, a separator, and a negative-electrode composition (in the case in which an electrolytic solution is to be contained), the various materials used are described as follows.

The positive-electrode composition contains a positive active material, an electroconductive material, and a binding agent. As the positive active material, there are, for examples, oxidizing agents such as manganese dioxide, nickel oxide, tungsten trioxide, lead dioxide, molybdenum trioxide, and the like, of which manganese dioxide and nickel oxide are preferred. The electroconductive material mentioned above refers to an electron-conductive material that is contained in the compositions to ensure their electron conductivity. As the electroconductive material, there are, for example, acetylene black, plumbago, graphite, carbon black, nickel powder, and the like, of which acetylene black is preferred. The binding agent mentioned above refers to a substance that is added to the compositions to improve the binding properties of the positive active material and the electroconductive material. As the binding agent, there are, for example, carboxymethylcellulose, polytetrafluoroethylene, salts of carboxymethylcellulose, polyvinyl alcohol, polyethylene, agar, methylcellulose, and the like. The electroconductive material and the binding agent can be present in the positive-electrode composition at the proportions of 3 to 20% by weight.

The separator can be composed of an electrolyte-supporting material, and can contain a binding agent. The electrolyte-supporting material can be any kind of material with electrical insulating properties. Examples of electrolyte-supporting material that meets such a requirement include silicon dioxide and aluminum oxide. The binding agent can be the same kind of material as used in the positive-electrode composition. The binding agent is preferably used at the proportion of 0 to 20 parts by weight per 100 parts by weight of the electrolyte-supporting material.

The negative-electrode composition may have the same ingredients as in the positive-electrode composition except that a negative active material is used in place of the positive active material. As the negative active material, there can be used hydrogen storage alloys with occluded hydrogen, and examples of these hydrogen storage alloys include TiNi, $TiNiB_{0.01}$, $TiNiMm_{0.01}$, $LaNi_5$, and TiFe. The proportions of electroconductive material and binding agent are the same as those given above for the positive-electrode composition.

Next, when a layered tablet is formed by use of a positive-electrode composition, a solid electrolyte composition instead of the separator, and a negative-electrode composition, the various materials used are described as follows.

The positive-electrode composition contains a positive active material, an electroconductive material, a binding agent, and a solid electrolyte. The positive active material, the electroconductive material, and the binding agent can be the same kind of materials as listed above for the positive-electrode composition. The solid electrolyte mentioned above refers to a substance that is contained in the compositions to ensure their ion conductivity. As the solid electrolyte, there can be used solid electrolyte substances with hydrogen-ion conductivity that are acid hydrates, such as stannic oxide ($SnO_2.3H_2O$) and ($Sb_2O_5.nH_2O$, where $n=3$ to 6). The electroconductive material and the binding agent can be present in the positive-electrode composition at the proportions of 3 to 20% by weight, and the solid electrolyte can be present in the positive-electrode composition at the proportion of 10 to 60% by weight.

The solid electrolyte composition can be composed of a solid electrolyte powder, and can contain a binding agent. The solid electrolyte powder is a powder of the solid electrolyte mentioned above as being contained in the positive-electrode composition, and the binding agent can be the same kind of materials as used in the positive-electrode composition. The binding agent is preferably used at the proportion of 0 to 20% parts by weight per 100 parts by weight of the electrolyte-supporting material.

The negative-electrode composition may have the same ingredients as in the positive-electrode composition described above except that a negative active material is used in place of the positive active material. As the negative active material, there can be used hydrogen storage alloys with occluded hydrogen, and examples of these hydrogen storage alloys include TiNi, $TiNiB_{0.01}$, $TiNiMm_{0.01}$, $LaNi_5$, and TiFe. The proportions of electroconductive material, binding agent, and solid electrolyte are the same as those given above for the positive-electrode composition.

The electron-conductive means is made of a material with electron conductivity that has in particular the properties of resistance to electrolytes and resistance to electrolytic solutions, and can be present either in the layered tablet or on the surface of the electrode. As the material for this electron-conductive means, there are, for examples, metals such as Ni, Au, Pt, Cu, Ag, Ti, W, Zn, Zr, and the like; alloys that contain two or more kinds of these metals; materials the surface of which is coated with one or more kinds of these metals; electroconductive polymers; electroconductive ceramics, or the like. The electron-conductive means can be of any shape such as a net shape, a woven cloth shape, a nonwoven cloth shape, a punched plate shape, or an absorbent cotton shape, but it must have holes or irregularities three-dimensionally. As preferred examples of electron-conductive means, there are, for example, a Ni net, a Pt net, and the like.

In the present invention, when the positive-electrode composition, the separator or solid electrolyte composition, and the negative-electrode composition are to be integrally formed by the application of pressure, in the inside or on the surface of at least one of the positive electrode or the negative electrode, there is provided an electron-conductive means to obtain a layered tablet, and this layered tablet is placed inside a battery case to give a battery.

Next, the manufacturing process for the battery of this invention will be explained with reference to FIGS. 1 to 6. The situation when both the positive electrode and the negative electrode contain an electron-conductive means will be described herein, but because the situation in which only one of the electrodes contains this electron-conductive means involves merely the omission of the electron-conductive means from the other electrode, the explanation of the manufacturing process in that situation is omitted here.

FIG. 1 shows a preferred embodiment of the battery of this invention. This battery comprises a positive-electrode composition 5, a separator or solid electrolyte composition 6, and a negative-electrode composition 7; electron-conductive means 4 is provided on the surfaces of the positive-electrode composition 5 and the negative-electrode composition 7.

Figure 2:
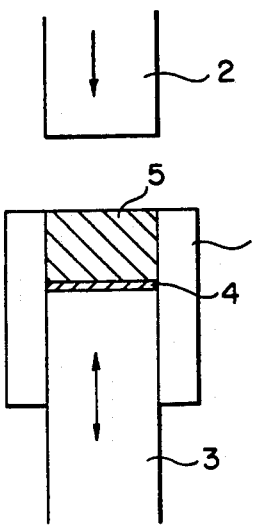
FIGS. 2 to 6 are schematic diagrams showing a series of manufacturing steps for the battery of this invention.

In FIG. 2, reference numeral 1 is a forming mold, reference numeral 2 is a pushing rod for the molding of a powder within the forming mold by the application of pressure, and reference numeral 3 is a holder for the forming mold 1. This holder 3 can move upwards and downwards inside the forming mold 1, so the depth of the forming mold 1 can be adjusted thereby.

Figure 3:
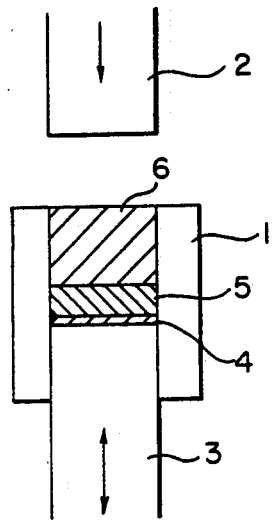

First, in a forming mold 1 that is set in this fashion, an electron-conductive means 4 is placed inside, and then the positive-electrode composition 5 in the form of a powder is put inside. The electron-conductive means 4 can also be put inside at the same time as the supplying of the positive-electrode composition 5 in the form of a powder. After this supplying, a pushing rod 2 is used to apply pressure, and the positive-electrode composition 5 is leveled out. Next, the separator or solid electrolyte composition 6 in the form of a powder is put into the forming mold 1 as is shown in FIG. 3.

Figure 4:
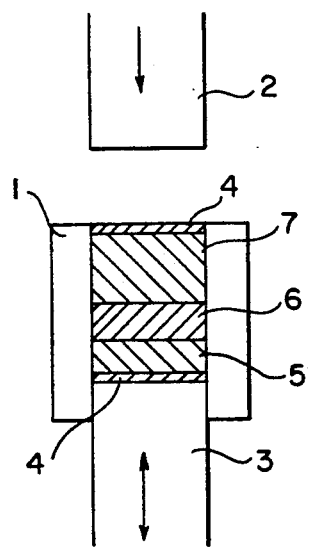

Next, the separator or mold electrolyte composition 6 is leveled out by the application of pressure by the pushing rod 2 in the same procedure as is described above, and then the negative-electrode composition 7 in the form of a powder is put into the forming mold 1, after which the electron-conductive means 4 is placed thereon. This situation is shown in FIG. 4. The electron-conductive means 4 can be put inside at the same time as the supplying of the negative-electrode composition 7. In addition, it is possible to put the positive-electrode composition 5 containing electron-conductive means 4, the separator or solid electrolyte composition 6, and the negative-electrode 7 containing the electron-conductive means 4, all in the form of powders, into the forming mold 1 in the opposite order from that given above.

Figure 5:
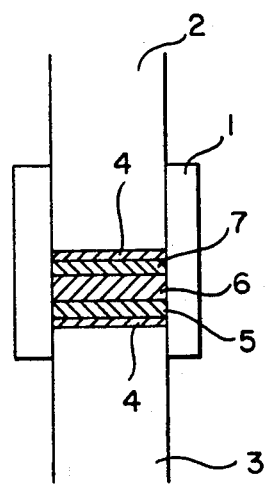

After this, the powders 4, 5, 6, 7, and 4 that have been placed inside the forming mold 1 are pressed by the pushing rod 2, so as to form them into one piece. The unit obtained in this way will be called the "layered tablet" below. The situation is illustrated in FIG. 5.

If the portion shown as reference numeral 6 is a powder that can be used in the manufacturing process as described above, it can be either a separator or solid electrolyte composition. If the portion shown as reference numeral 6 is a separator, it contains an electrolyte-supporting material, in which the electrolytic solution is held in the spaces between the particles of powder or on the surface of the powder, thereby attaining the objectives of this invention. If the portion shown as reference numeral 6 is a solid electrolyte composition, it contains a solid electrolyte with ion conductivity, thereby attaining the objectives of this invention.

Figure 6:
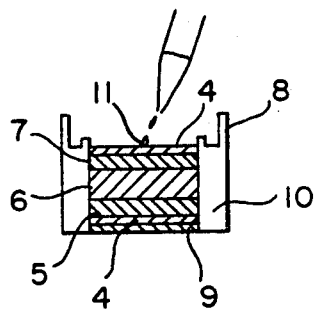

The layered tablet integrally formed as described above is removed from the forming mold 1, and as is shown in FIG. 6, is placed in a battery case 8. In this figure, reference numeral 9 is a current collecting material, and reference numeral 10 is insulating packing. If the portion shown as reference numeral 6 is a separator, it is later immersed in an electrolytic solution 11 provided in the layered tablet. It is also possible to provide the electrolytic solution 11 in the battery case 8 beforehand, or to supply the layered tablet already provided with electrolytic solution 11 in the battery case 8. However, when the portion shown as reference numeral 6 is a solid electrolyte composition, it is not necessary to provide the electrolytic solution 11 described above.

Finally, as is shown in FIG. 1, the cover 12 is attached to the battery case 8, and both the battery case 8 and the cover 12 are tightly sealed.

The manufacturing process described above is not limited to batteries in which the electrolytic solution is an aqueous alkaline solution, but can be used to produce batteries that use other kinds of liquid electrolytes such as aqueous acidic solutions and organic solvents, and batteries that use solid electrolytes.

EXAMPLES

The invention will be further illustrated by the following examples, but not limited thereby.

Example 1

For the positive-electrode composition, 10 parts by weight of γ-manganese dioxide powder, 2 parts by weight of acetylene black as the electroconductive material, and 1 part by weight of carboxymethylcellulose as the binding agent were used in a powdered mixture. First, 200 mg of this powder was put on a Ni net (100 mesh) cut into a disk with a diameter of 15 mm that had already been placed in a forming mold; the whole was pressed slightly from above by a pushing rod.

For the separator powder, 20 parts by weight of silicon dioxide powder as the electrolyte-supporting material and 1 part by weight of carboxymethylcellulose as the binding agent were used in a powdered mixture. Then 200 mg of this powder was put on top of the positive-electrode composition that had already been placed in the forming mold, and the whole was pressed slightly from above by the pushing rod.

For the negative-electrode composition, 10 parts by weight of a hydrogenated powder of the hydrogen storage alloy $TiNiMm_{0.01}$, 1 part by weight of acetylene black as the electroconductive material, and 1 part by weight of carboxymethylcellulose as the binding agent were used in a powdered mixture. Then, 200 mg of this powder was put on top of the positive-electrode composition and the separator that had already been placed in the forming mold, and a Ni net (100 mesh) cut into a disk with the diameter of 15 mm was placed thereon. The whole was pressed from above at the pressure of 200 $kgw/cm^2$, by the pushing rod.

In this way, a layered tablet for the contents of a battery was obtained. The layered tablet was removed from the forming mold and put into a battery case. To this case, 100 $\mu l$ of a 30 wt % aqueous solution of potassium hydroxide was added, and the battery case was sealed.

Figure 7:
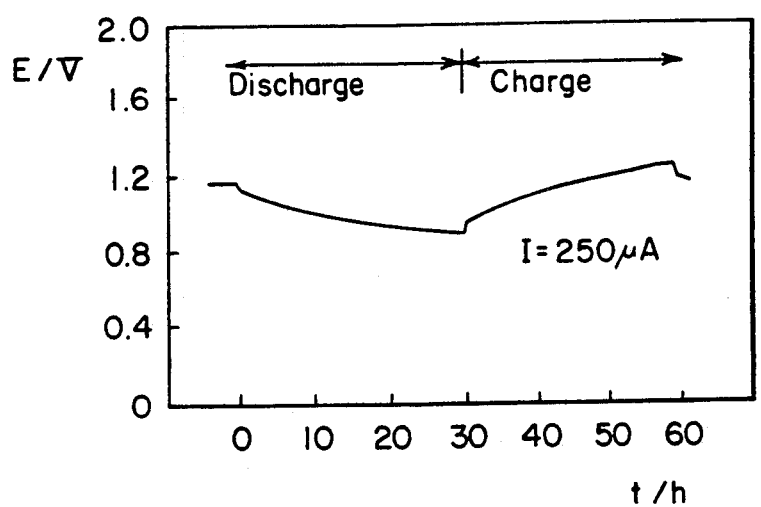
FIGS. 7 and 8 are of curves showing the charging and discharging characteristics with regard to the batteries of this invention.

The battery obtained as described above was tested for its charging and discharging characteristics at 25° C., and the results are shown in FIG. 7.

Example 2

For the positive-electrode composition, 10 parts by weight of nickel hydroxide, 2 parts by weight of acetylene black as the electroconductive material, and 0.5 part by weight of polytetrafluoroethylene powder as the binding agent were used in a powdered mixture. The mixture was put on a nickel substrate and charged in a 30 wt % aqueous solution of potassium hydroxide. Thereafter, the mixture was removed from the nickel substrate, and pulverized to obtain a powder. Then, 200 mg of this powder was put into a forming mold with an inner diameter of 15 mm that already contained a Ni net (100 mesh) cut into a disk with a diameter of 15 mm. The whole was pressed slightly from above by a pushing rod.

For the separator powder, 20 parts by weight of α-alumina powder as the electrolyte-supporting material and 1 part by weight of carboxymethylcellulose as the binding agent were used in a powdered mixture. Then, 200 mg of this powder was put on top of the positive-electrode composition that had already been placed in the forming mold; the whole was pressed slightly from above by the pushing rod.

For the negative-electrode composition, powder prepared in the same way as in Example 1 was used. Then, 200 mg of this powder was put on top of the positive-electrode composition and the separator that had already been placed in the forming mold, and a Ni net (100 mesh) cut into a disk with a diameter of 15 mm was placed thereon; the whole was then pressed from above at the pressure of 200 $kgw/cm^2$ by the pushing rod.

In this way, the contents of a battery were obtained in the form of a layered tablet. This layered tablet was removed from the forming mold and placed in a battery case. To this case was added 100 $\mu l$ of a 30 wt % aqueous solution of potassium hydroxide, and then the battery case was sealed.

Figure 8:
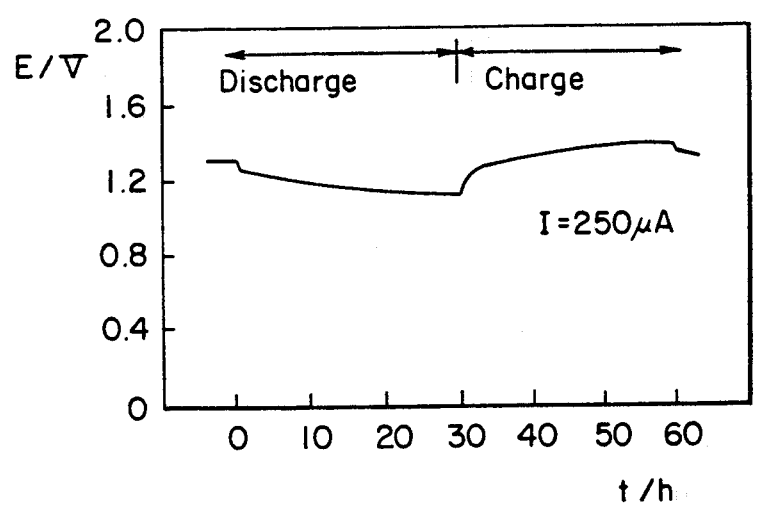

The battery obtained as described above was tested for its charging and discharging characteristics at 25° C., and the results found are shown in FIG. 8.

COMPARATIVE EXAMPLES

A battery was manufactured in the same way as described in Example 1 except that a Ni net cut into a disk with a diameter of 15 mm as the electron-conductive means was not used when the layered tablet was prepared.

Figure 9:
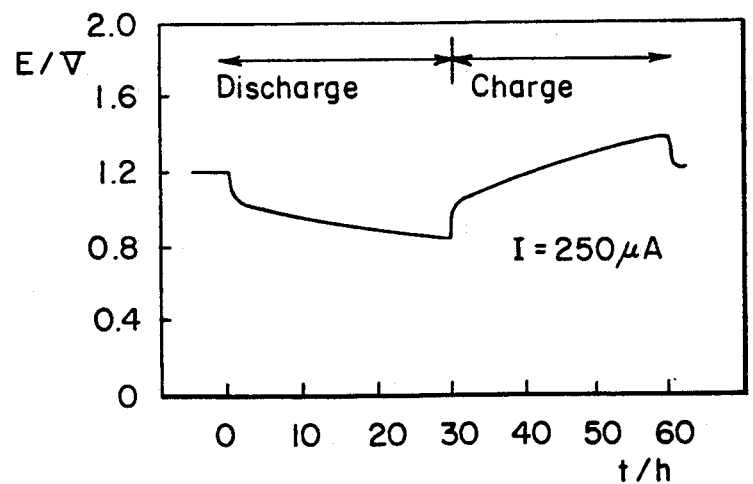
FIG. 9 is of a curve showing the charging and discharging characteristics with regard to a conventional battery.

The battery obtained in this way was tested for its charging and discharging characteristics at 25° C., and the results are shown in FIG. 9.

As seen from the results shown in FIGS. 7 to 9, according to this invention, it is possible to obtain a battery with small polarizability, in which at least one of the positive-electrode composition and the negative-electrode composition have an electron-conductive means.

It is understood that various other modifications will be apparent to and can be readily made by those skilled in the art without departing from the scope and spirit of this invention. Accordingly, it is not intended that the scope of the claims appended hereto be limited to the description as set forth herein, but rather that the claims be construed as encompassing all the features of patentable novelty that reside in the present invention, including all features that would be treated as equivalents thereof by those skilled in the art to which this invention pertains.

What is claimed is:

1. A battery comprising a cell tablet and a pair of current collector plates disposed respectively on the upper face and lower face of said cell tablet; said cell tablet having a positive-electrode powder composition, a solid electrolyte powder composition, and a negative-electrode powder composition in this order, and further having an electron-conductive means in the inside or on the surface of at least one of said positive-electrode powder composition and said negative-electrode powder composition, wherein said cell tablet is formed into a four- or five-layered tablet by the application of pressure, thereby reducing the internal resistance of said battery; wherein said positive-electrode powder composition comprises a positive active material, an electroconductive material, a binding agent, and a solid electrolyte; said negative-electrode powder composition comprises a negative active material, an electroconductive material, a binding agent, and a solid electrolyte; and said solid electrolyte powder composition comprises a solid electrolyte; wherein said positive active material is manganese dioxide or nickel oxide; said negative active material is selected from the group consisting of TiNi, TiNiB$_{0.01}$, TiNiMm$_{0.01}$, LaNi$_5$, and TiFe; said electroconductive material is acetylene black; said binding agent is present in said positive-electrode powder composition and said negative-electrode powder composition in an amount of 3 to 20% by weight; and said solid electrolyte comprises an acid hydrate selected from the group consisting of SnO$_2$.3H$_2$O and Sb$_2$O$_5$.nH$_2$O (n=3 to 6), in an amount of 10 to 60% by weight; wherein said electron-conductive means is selected from the group consisting of metals, metal alloys, metal-coated materials, electroconductive polymers, and electroconductive ceramics.

2. A battery comprising a cell tablet and a pair of current collector plates disposed respectively on the upper face and lower face of said cell tablet, said cell tablet having:
   a positive-electrode powder composition comprising:
   a positive active material selected from the group consisting of manganese dioxide, nickel oxide, tungsten trioxide, lead dioxide, and molybdenum trioxide;
   an electroconductive material selected from the group consisting of acetylene black, plumbago, graphite, carbon black, and nickel powder, said electroconductive material being present in an amount of 3 to 20% by weight based on the total weight of said positive-electrode powder composition;
   a binding agent selected from the group consisting of carboxymethylcellulose, polytetrafluoroethylene, salts of carboxymethylcellulose, poly vinyl alcohol, polyethylene, agar, and methylcellulose, said binding agent being present in an amount of 3 to 20% by weight based on the total weight of said positive-electrode powder composition; and
   a solid electrolyte selected from the group consisting of SnO$_2$.3H$_2$O and Sb$_2$O$_5$.nH$_2$O (n=3 to 6), said solid electrolyte being present in an amount of 10 to 60% by weight based on the total weight of said positive-electrode powder composition;
   a negative-electrode powder composition comprising:
   a negative active material selected from the group consisting of TiNi, TiNiB$_{0.01}$, TiNiMm$_{0.01}$, LaNi$_5$, and TiFe;
   an electroconductive material selected from the group consisting of acetylene black, plumbago, graphite, carbon black, and nickel powder, said electroconductive material being present in an amount of 3 to 20% by weight based on the total weight of said negative-electrode powder composition;
   a binding agent selected from the group consisting of carboxymethylcellulose, polytetrafluoroethylene, salts of carboxymethylcellulose, polyvinyl alcohol, polyethylene, agar, and methylcellulose, said binding agent being present in an amount of 3 to 20% by weight based on the total weight of said positive-electrode powder composition; and a solid electrolyte selected from the group consisting of SnO$_2$.3H$_2$O and Sb$_2$O$_5$.nH$_2$O (n=3 to 6), said solid electrolyte being present in an amount of 10 to 60% by weight based on the total weight of said negative-electrode powder composition;
   a solid electrolyte powder composition positioned between said positive-electrode powder composition and said negative-electrode powder composition, comprising a solid electrolyte selected from the group consisting of SnO$_2$.3H$_2$O and Sb$_2$O$_5$.nH$_2$O (n=3 to 6); and
   an electron-conductive means positioned in the inside or on the surface of at least one of said positive-electrode powder composition and said negative-electrode powder composition, said electron-conductive means being selected from the group consisting of metals, metal alloys, metal-coated materials, electroconductive polymers, and electroconductive ceramics,
   wherein said cell tablet is formed into a four- or five-layered tablet by the application of pressure, thereby reducing the internal resistance of said battery.

3. A battery according to claim 2, wherein said solid electrolyte powder composition further comprises a binding agent selected from the group consisting of carboxymethylcellulose, polytetrafluoroethylene, salts of carboxymethylcellulose, polyvinyl alcohol, polyethylene, agar, and methylcellulose, said binding agent being present in a proportion of not more than 20 parts by weight per 100 parts by weight of said electrolyte-supporting material.

4. A battery according to claim 3, wherein said positive active material is manganese dioxide or nickel dioxide; said negative active material is $TiNiMm_{0.01}$; said electroconductive material is acetylene black; said binding agent contained in the positive-electrode powder composition and the negative-electrode powder composition is carboxymethylcellulose or polytetrafluoroethylene; said solid electrolyte contained in the positive-electrode powder composition, the negative-electrode powder composition, and the solid electrolyte powder composition, is $SnO_2 \cdot 3H_2O$ and $Sb_2O_5 \cdot nH_2O$ (n=3 to 6); said binding agent contained in the solid electrolyte powder composition is carboxymethylcellulose; and said electron-conductive means is a nickel net.

* * * * *

UNITED STATES PATENT AND TRADEMARK OFFICE
CERTIFICATE OF CORRECTION

PATENT NO. : 5,004,657

DATED : April 2, 1991

INVENTOR(S) : Tetsuya YONEDA and Shin SATO

It is certified that error appears in the above-identified patent and that said Letters Patent is hereby corrected as shown below:

On the title page of U.S. Patent No. 5,004,657, Item [30], please change the Priority Document Number to read 62-225997.

Signed and Sealed this

Twenty-ninth Day of December, 1992

*Attest:*

DOUGLAS B. COMER

*Attesting Officer*     *Acting Commissioner of Patents and Trademarks*